United States Patent [19]

Masai et al.

[11] 3,719,727
[45] March 6, 1973

[54] FIREPROOF, THERMOPLASTIC POLYESTER-POLYARYL PHOSPHONATE COMPOSITION

[75] Inventors: Yukito Masai, Otsu-shi; Yasuo Kato, Shiga-gun; Nobuhiko Fukui, Otsu-shi, all of Japan

[73] Assignee: Toyo Boseki Kabushiki Kaisha (Toyo Spinning Co., Ltd.), Kita-ku, Osaka-shi, Osaka-fu, Japan

[22] Filed: March 18, 1971

[21] Appl. No.: 125,709

[30] Foreign Application Priority Data

March 19, 1970 Japan ..................................45/23910

[52] U.S. Cl. ..............260/860, 260/45.7 PS, 260/49
[51] Int. Cl. ..........................C08g 39/10, C08g 51/54
[58] Field of Search ..................260/860, 49, 45.7 PS

[56] References Cited

UNITED STATES PATENTS 2,682,522  6/1954  Coover et al. ..........................260/49
3,284,543  11/1966  Gillham et al. ..................260/45.7 PS
3,341,625  9/1967  Gillham et al. ..................260/45.7 PS

*Primary Examiner*—William H. Short
*Assistant Examiner*—Edward Woodberry
*Attorney*—Craig, Antonelli, Stewart & Hill

[57] ABSTRACT

A fireproof, thermoplastic polyester composition which comprises a polyester and a polyaryl phosphonate incorporated therein in an amount of 0.4 to 4.0 weight percent as phosphorus to the polyester, the said polyaryl phosphonate being not less than 6 in the degree of polymerization and containing as its diol component a sulfone compound of the formula:

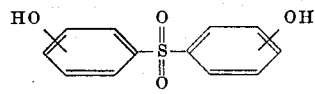

wherein the benzene ring(s) may bear one or more lower alkyl groups with or without any other diol compound.

13 Claims, 1 Drawing Figure

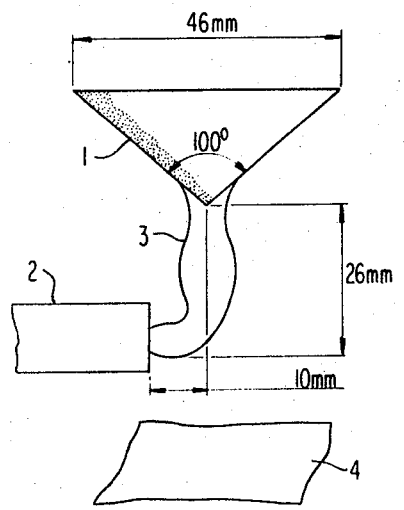

FIREPROOF, THERMOPLASTIC POLYESTER-POLYARYL PHOSPHONATE COMPOSITION

The present invention relates to a polyester composition having a fireproof property. More particularly, it relates to a fireproof, thermoplastic polyester composition which can be melt moulded without any material decrease in the degree of polymerization.

Thermoplastic polyesters are widely used in production of fibers, films and the like. However, most of them, e.g. polyethylene terephthalate, are inflammable so that their acquisition of a fireproof property is highly demanded.

For giving a fireproof property to polyesters, various compounds such as halogen compounds, phosphorus compounds and metal compounds have heretofore been incorporated into polyesters. Among them, esters of phosphoric acid, phosphorous acid and phosphonic acid containing or not halogen atoms afford a relatively high fireproof property to polyesters. However, when a polyester incorporated with such ester is subjected to melt moulding, for example, melt spinning, ester exchange takes place between the polyester and the ester whereby the polymerization degree and the melt viscosity of the polyester are lowered. Consequently, spinning can hardly be performed, or even if performed, the resulting filaments are inferior in the quality and meet troublesome problems on the practical use.

The thermoplastic polyester composition according to the present invention comprises a polyester and a polyaryl phosphonate incorporated therein in an amount of 0.4 to 4.0 weight percent as phosphorus to the polyester, the said polyaryl phosphonate being not less than 6 in the degree of polymerization and containing as its diol component a sulfone compound of the formula:

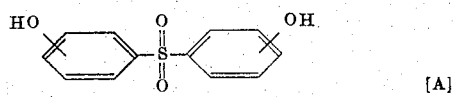

[A]

wherein the benzene ring(s) may bear one or more lower alkyl groups with or without at least one of the aromatic diol compounds of the formulae:

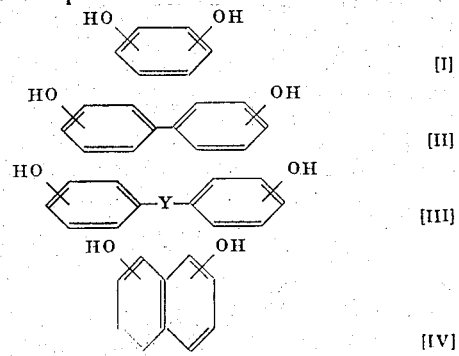

[I]

[II]

[III]

[IV]

Wherein Y is alkylidene or cycloalkylidene having one to six carbon atoms (e.g. methylene, isopropylidene, cyclohexylidene) and the benzene ring may bear one or more lower alkyl(s). Though the polyester composition includes a phosphorous compound as a fireproof agent, it is scarcely lowered in the degree of polymerization and deteriorated in other physical and chemical properties on melt moulding.

The said polyaryl phosphonate can be prepared by reacting the sulfone compound [A] or its mixture with at least one of the aromatic diol compounds [I] to [IV] with a compound of the formula:

[V]

wherein R is aryl (e.g. phenyl, tolyl, xylyl, naphthyl) and X is chlorine or bromine. The reaction may be executed by heating a mixture of these reactants in approximately equimolar amounts at 100° to 200°C under atmospheric pressure and then at 150° to 250°C under atmospheric or reduced pressure in an inert gas or dry air, preferably in the presence of a catalyst such as magnesium chloride or calcium chloride. Alternatively, the reaction may be carried out by surface polymerization of the compound [V] dissolved in a solvent such as methylene chloride with the sulfone compound [A] or its mixture with at least one of the aromatic diol compounds [I] to [IV] as alkali metal salt(s) dissolved in water while stirring.

Examples of the sulfone compound [A] are 4,4'-dihydroxydiphenyl sulfone, 2,4'-dihydroxydiphenyl sulfone, 3,3'-dimethyl-4,4'-dihydroxydiphenyl sulfone, 2,2'-dimethyl-4,4'-dihydroxy-5,5'-di-t-butyldiphenyl sulfone, 2,2'-dihydroxy-3,3'-dimethyldiphenyl sulfone, 3,3', 5 '-tetramethyl-4,'-dihydroxydiphenyl sulfone, etc.

Examples of the aromatic diol compounds [I] to [IV] are hydroquinone, resorcinol, 4,4'-dihydroxybiphenyl, 4,4'-methylenebisphenol, 4,4'-ethylidenebisphenol, 4,4'-isopropylidenebisphenol, 4,4'-cyclohexlidenebisphenol, 2,2'-methylenebisphenol, 1,5-dihydroxynaphthalene, 2,7-dihydroxynaphthalene, etc.

Examples of the compound [V] phenyldichlorophosphine oxide, phenyldibromophosphine oxide, etc.

The polyaryl phosphonate to be used in this invention is required to be not less than 6 in the degree of polymerization when calculated from the molecular weight which is determined by the vapor pressure osmometry using chloroform as a solvent at 35°C. Particularly preferred is the one, of which the degree of polymerization is 10 or more. When the degree of polymerization is below 6, the polyaryl phosphonate is not stable and the viscosity of the polyester incorporated therewith is considerably lowered.

In general, the polyaryl phosphonate having a sulfonyl group in its molecular chain reveals a better fireproof property than any polyaryl phosphonate having no sulfonyl group. For preparation of the polyaryl phosphonate, the use of the sulfone compound [A] alone or together with any other aromatic diol compound [I] to [IV] containing the former in an amount above 30 mol percent, especially above 50 mol percent, to the total amount of the mixture is thus preferred.

In the composition of the invention, the amount of the polyaryl phosphonate is 0.4 to 4.0 weight percent, preferably 0.6 to 3.0 weight percent as phosphorus to the polyester. The incorporation of the polyaryl phosphonate into the polyester is preferably carried out after the polycondensation of the polyester is completed.

According to this invention, various thermoplastic polyesters can be made non-inflammable. For example, polyethylene terephthalate, fiber-forming copolymerized polyester containing not less than 80 mol percent of ethylene terephthalate unit, poly-1,4-cyclohexylidenedimethylene terephathalate, polyethylene sebacate, polyethylene adipate and the like are advantageously provided with a fireproof property.

On the incorporation of the polyaryl phosphonate into the polyester for melt spinning, it is desirable to place the former under the melt condition as shortly as possible. Further, it is favorable to add the polyaryl phosphonate to the polyester after completion of the polymerization and just before the spinning. When the addition is performed at the beginning or middle stage of polymerization, coloring of the polyester may be caused, and the completion of the reaction will be delayed. The addition at the final stage of polymerization may lower the viscosity of the polyester and will increase the coloring of the product by ultraviolet ray.

The polyaryl phosphonate may be employed in the form of pellet. For preparation of pellets, the polyaryl phosphonate is melt polymerized, extruded out of a nozzle at the bottom of the reaction vessel under the pressure of nitrogen and cut while hot to give pellets. Alternatively, a solution of the polyaryl phosphonate in a soluble solvent (e.g. chloroform, tetrachloroethane) is poured into an insoluble solvent (e.g. methanol), and the precipitated powder is moulded in pellets, after tableted as the case may be, by the aid of an extruder.

The mixture of the polyester and the polyaryl phosphonate may be subjected to melt spinning as such or preferably after moulded in pellets by the aid of a pelletizer to give filaments, which are scarcely colored or lowered in the degree of polymerization and hardly colored by ultraviolet ray. Still, the polyaryl phosphonate may alternatively be incorporated into the polyester in a melted state during spinning.

The polyester composition of the present invention possesses an excellent fireproof property and shows a good affinity to cationic dyes and dispersion dyes and a sufficient pilling resistance after dyeing at high temperature and bleaching.

Practical and presently preferred embodiments of the present invention are illustratively shown in the following Examples wherein parts are by weight.

In these Examples, the intrinsic viscosity of the polyester is measured in a phenol-tetrachloroethane mixture (3:2) at 30°C.

The non-inflammability is estimated using an apparatus shown in FIG. 1 of the attached drawing in the following manner:

1. The flame-remaining time and the ratio of unburnt residue: The test composition (1 g) in powder of about 20 mesh is charged in a conical vessel 1 made of stainless steel wire No. 36 (50 mesh). The bottom of the vessel is contacted for 20 seconds with a butane gas flame 3 containing air which is introduced from a hole of 2 mm in diameter by the use of a microburner 2 of 6 mm in hole diameter. The shape of the vessel, the bulk of the flame and the distance between the bottom of the vessel and the flame are as shown in FIG. 1. The temperature of the upper part of the flame which is contacted with the vessel is about 750°C. A part of the test composition is melted and drops into an aluminum foil 4. The unburnt residue present in the wire vessel and in the aluminum foil is weighed, and the ratio by weight percent to the initial weight of the test composition as well as the flame-remaining time after removal of the fire are used for estimation of the non-inflammability.

2. The coil method: A plain fabric of filaments made of the test composition and being 10 cm in width and 1 g in weight is rolled and inserted into a supporting coil made of hard stainless steel and being 10 mm in inner diameter, 2 mm in interval and 15 cm in length. The coil is hung in a draft-proof chamber at an angle of 45 degrees. The test composition is ignited with a burner set up in such a manner that the top of the flame of 45 mm in length is contacted with the bottom of the test composition. As the fuel, liquefied petroleum gas is employed. Ignition is continued until combustion of the test material ceases. Then, the coil is contacted with the flame until the lower part of 9 cm in length of the test material is completely burnt. When the contact times with the flame are 3 or more, the non-inflammability of the test material is regarded as satisfactory.

3. The oxygen index "$n$": According to the oxygen index method described in ASTM D-2863-70, the oxygen index "$n$" is determined using a sheet of plain fabric made of the test composition, being 10 cm in length and 5 cm in width and tightly rolled up in a stick-like shape.

The number average molecular weight of the polyaryl phosphonate is measured by the vapor pressure osmometry at 35°C. in chloroform, and the degree of polymerization is determined therefrom.

PREPARATION OF FIREPROOF AGENTS

PROCEDURE 1

A mixture of 4,4'-dihydroxydiphenyl sulfone (36 parts), phenyldichlorophosphine oxide (29.3 parts) and calcium chloride (0.2 part) is heated in nitrogen stream at 150°C for 90 minutes, at 170°C for 30 minutes and then at 190°C for 30 minutes. After the temperature is raised up to 250°C in 30 minutes, the reaction mixture is kept at this temperature for 10 minutes under a reduced pressure of about 100 mmHg. Nitrogen gas is introduced so as to recover the atmospheric pressure. Then, the reaction mixture is cooled to give a brown solid, which is designated as a fireproof agent A. Molecular weight, 5,800. Degree of polymerization, 15.0. M.P., 187°C.

In the same manner as above but using an equimolar amount of hydroquinone in place of 4,4'-dihydroxydiphenyl sulfone, there is prepared a polyphosphonate, which is designated as a fireproof agent X for control. Degree of polymerization, 32, M.P., 120°C.

PROCEDURE 2

The fireproof agent A (20 g) is dissolved in chloroform (50 ml), and the resultant solution is poured into methanol (300 ml). The formed precipitate is collected, washed well with methanol, filtered and dried under reduced pressure to give white powder (19 g), which is designated as a fireproof agent B. Molecular weight, 7,400. Degree of polymerization, 19.5. M.P., 175°C.

PROCEDURE 3

A mixture of phenyldichlorophosphine oxide (1 mol), 4,4'-dihydroxydiphenyl sulfone (0.48 mol), resorcinol (0.48 mol) and a catalytic amount of calcium chloride is heated in nitrogen stream at 150°C for 4 hours, at 180°C for 15 hours and then under reduced pressure at 200°C for 2 hours. The product is designated as a fireproof agent C. Degree of polymerization, 18. M.P., 140° to 150°C.

PROCEDURE 4

A mixture of 4,4'-dihydroxydiphenyl sulfone (40 parts), phenyldichlorophosphine oxide (29.3 parts) and calcium chloride (0.25 part) is heated in nitrogen stream at 150°C for 90 minutes, at 180°C for 30 minutes and then at 200°C for 30 minutes. After the mixture is kept under reduced pressure for 10 minutes, nitrogen gas is introduced so as to recover the atmospheric pressure. The reaction mixture is cooled to given a brown solid which is designated as a fireproof agent Y for control. Molecular weight, 2150. Degree of polymerization, 5.8. M.P., 170°C.

PROCEDURE 5

A mixture of 4,4'-dihydroxydiphenyl sulfone (2,100 g), 2,4'-dihydroxydiphenyl sulfone (371 g), phenyldichlorophosphine oxide (1950 g), calcium chloride (7 g) and 1,1,2,2-tetrachloroethane (3.6 L) is gradually heated up to the boiling temperature of 1,1,2,2-tetrachloroethane in about 8 hours. After heating under reflux for 7 hours, the reaction mixture is diluted with 1,1,2,2-tetrachloroethane (5.4 L). The resultant solution is added dropwise to methanol (about 90L), and the precipitate is collected by filtration and dried to give white powder, which is designated as a fireproof agent D. Molecular weight, 10300. Average degree of polymerization, 27.7. M.P., 180°C.

PROCEDURE 6

A mixture of bis(3-methyl-4-hydrophenyl)sulfone (25 g), phenyldichlorophosphine oxide (18.3 g) and calcium chloride (100 mg) is gradually heated up to 140° to 250°C in nitrogen stream in 7 hours and then heated at 260°C for 15 hours under a reduced pressure below 5 mmHg to give yellowish brown solid. Number average molecular weight, 7,300. The solid (30 g) is dissolved in chloroform (70 ml), and the resultant solution is added dropwise to methanol (700 ml) to give precipitate (27 g), which is designated as a fireproof agent E. M.P., 204°C. Molecular weight, 8,900. Average degree of polymerization, 22.2.

PROCEDURE 7

A mixture of bis(3,5-dimethyl-4hydroxyphenyl)sulfone (15.3 g), phenyldichlorophosphine oxide (10.2 g) and calcium chloride (300 mg) is treated in the same manner as in Procedure 6 to give a yellowish brown solid. The solid (19 g) is dissolved in chloroform (50 ml), and the resultant solution is added dropwise to methanol (500 ml) to give white powder (15 g), which is designated as a fireproof agent F. Average molecular weight, 4,200. Average degree of polymerization, 9.7. M.P., 223°C.

PROCEDURE 8

As in Procedure 1 but using resorcinol in place of 4,4'-(dihydroxydiphenyl)sulfone, there is obtained a yellow solid, which is designated as a fireproof agent Z. Degree of polymerization, 25. M.P., 70° to 88°C.

Further as in Procedure 1 but using 4,4'-isopropylidenebisphenol in place of 4,4'-dihydroxydiphenylsulfone, there is obtained a yellow solid, which is designated as a fireproof agent N. Degree of polymerization, 10. M.P., 100 to 110°C.

PROCEDURE 9

The reaction product (molecular weight, 11,000) (3.5 kg) obtained in Procedure 5 is dissolved in chloroform (21 L). To the solution, methanol (17.5 L) is added, and the resultant mixture is stirred. The upper layer of the mixture is removed by decantation. The lower layer is added dropwise to methanol to give white powder (2,735 g), which is designated as a fireproof agent H. To the upper layer, methanol (2.7 L) is added, and the resultant mixture is stirred. The lower layer is concentrated under reduced pressure to give a residue, which is designated as a fireproof agent I. The upper layer is further treated with methanol in the amount as shown in Table 1 in the same manner as above so as to repeat separation. The separated products are designated as foreproof agents J, K, L and M respectively. The yields and the physical prodperies of the fireproof agents are shown in Table 1.

Table 1

| Fire proof agent | Amount of methanol added (L) | Yield (g) | Average molecular weight | Average degree of polymerization |
|---|---|---|---|---|
| H | 17.5 | 2730 | 11780 | 31.7 |
| I | 2.7 | 290 | 4500 | 12.1 |
| J | 0.87 | 140 | 4320 | 11.6 |
| K | 1.17 | 98 | 3970 | 10.7 |
| L | 2.27 | 60 | 3070 | 8.3 |
| M | (Concentration) | 182 | 1350 | 3.6 |

EXAMPLE 1

Polyethylene terephthalate (intrinsic viscosity, 0.63) is pulverized in powder below 20 mesh and admixed with the fireproof agent A, B or Y. The resulting mixture is dried in a glass ampoule at 110° to 120°C under a pressure of 0.1 mmHg for 16 hours. The dried mixture is kneaded well at 280°C for 30 minutes in nitrogen stream and then cooled to give non-inflammable polyethylene terephthalate. The intrinsic viscosity and the non-inflammability are shown in Table 2.

Table 2

| Fireproof agent | | intrinsic viscosity | Non-inflammability | |
|---|---|---|---|---|
| Kind | Amount *) | | flame-remaining time (seconds) | Ratio of unburnt residue (%) |
| | 0 | 0.63 | 36 | 76 |
| A | 9 (0.78) | 0.50 | 0.5 | 97 |
| B | 7 (0.60) | 0.52 | 2 | 97 |
| Y | 8 (0.70) | 0.40 | 0.5 | 98 |

Note: *) The amount is by weight %. The parenthesized numeral represents the amount as phosphorus.

From the above Table, it is apparent that when the fireproof agent Y for control is used, the intrinsic viscosity of the resultant polyethylene terephthalate is greatly lowered, though the non-inflammability is sufficiently high.

EXAMPLE 2

Polyethylene terephthalate (intrinsic viscosity, 0.62) is pulverized in powder below 20 mesh and admixed with the fireproof agent C in an amount of 10 weight percent (1.06 percent as phosphorus). The resultant mixture is treated in the same manner as in Example 1 except that kneading is performed at 275°C for 20 minutes to give non-inflammable polyethylene terephthalate. The intrinsic viscosity is 0.60. The flame-remaining time is 6 seconds and the ratio of the unburnt residue is 93 percent.

EXAMPLE 3

Non-inflammable polyethylene terephthalate is prepared in the same manner as in Example 2 but using the fireproof agent A or X. The non-inflammability is shown in Table 3.

Table 3

| amount of fireproof agent (%) *) | Fireproof agent A Flame-remaining time (seconds) | Ratio of unburnt residue (%) | Fireproof agent X Flame-remaining time (seconds) | ratio of unburnt residue (%) |
|---|---|---|---|---|
| 0 | 36 | 76 | 36 | 76 |
| 0.01 | 39 | 76 | 38 | 76 |
| 0.10 | 50 | 74 | 49 | 75 |
| 0.27 | 52 | 68 | 52 | 75 |
| 0.38 | 13 | 90 | 46 | 75 |
| 0.50 | 4 | 96 | 39 | 78 |
| 0.74 | 1 | 97 | 25 | 88 |
| 1.00 | 0 | 98 | 12 | 93 |
| 1.50 | 0 | 98 | 0 | 98 |
| 3.00 | 0 | 98 | 0 | 98 |

Note: *) The amount as phosphorus is shown.

From the above Table, it is seen that the fireproof agent A is more effective than the fireproof agent X.

EXAMPLE 4

Polyethylene terephthalate pellets obtained using zinc-gelmanium as a catalyst is admixed with the fireproof agent D and dried at 105° to 110°C under a pressure below 1 mmHg for 16 hours. The mixture is pelletized by the aid of an extruder of 40 mm in inner diameter wherein the temperatures of the barrel and the nozzle are 280°C with a flowing amount of 150 g/min. The obtained pellets are dried at 105° to 110°C under a pressure of 1 mmHg for 16 hours and subjected to melt spinning by the aid of an extruder spinning machine of 30 mm in inner diameter nuder the following conditions: diameter of nozzle, 0.3 mm; number of holes, 36; spinning velocity, 900 m/min.; flowing amount, 25.5 g/min.; spinning temperature, 275°C at the barrel and 280°C at the nozzle. Spinning is carried out smoothly without trouble such as snapping. The obtained filament is stretched by the aid of a stretcher wherein the temperatures of the pin and the plate are 90° and 150°C respectively with a stretching velocity of 220 m/min. up the the length of 3.51 times.

For comparison, polyethylene terephthalate which is not admixed with any fireproof agent is pelletized and subject to melt spinning in the same manner as above but the temperature of the nozzle is 292°C.

The properties of the yarns thus obtained are determined, and the results are shown in Table 4.

Table 4

| Test material | I | II |
|---|---|---|
| Intrinsic viscosity of polyethylene terephthalate [$\eta$] | 0.68 | 0.67 |
| Amount of fireproof agent (parts | 8 | |
| Intrinsic viscosity of polyethylene terephthalate pellets admixed with or without fireproof agent [$\eta$] | 0.65 | 0.62 |
| Stretched yarn | | |
| Fineness (d) | 2.07 | 2.10 |
| Strength (g/d) | 3.82 | 4.53 |
| Elongation (%) | 31.5 | 30.4 |
| Strength of knot (g/d) | 3.34 | 3.93 |
| Elongation of knot (%) | 15.3 | 10.7 |
| Melting point (°C) | 265 | 260 |
| Non-inflammability (coil method) (number of times) | | |
| Before refining | 6-7 | 1-2 |
| After refining | 6-7 | 1-2 |
| After refining and bleaching | 6-7 | 1-2 |
| After refining, bleaching, and treatment with fluorescent dye | 5 | 1-2 |
| After refining and dyeing | 6 | 1-2 |
| After dry cleaning (10 times) | 6-7 | 1-2 |
| After washing with soap (10 times) | 6-7 | 1-2 |
| Oxygen index (n %) | 29 | 21 |

The treatments shown in the above Table are carried out as follows:

Refining: The yarn is treated with "Noigen EA-120" (nonionic surfactant manufactured by Daiichi Kogyo Seiyaku Co., Ltd.) (2 g/L) with a solution ratio of 1 : 50 at 70°C for 20 minutes, washed water and dried.

Bleaching with chlorite: The yarn is treated with sodium chlorite (2 g/L) or 10 percent acetic acid (10 ml/L) with a solution ratio of 1 : 30 at 100°C for 60 minutes and washed with water. Then, the product is treated with sodium bisulfite (2 g/L) with a solution ratio of 1 : 50 at 70°C for 20 minutes, washed with water and dried.

Treatment with fluorescent dye: The product obtained by treatment with chlorite is treated with "-Mikawhite ATconc" (fluorescent dye manufactured by Mitsui Chemical Co., Ltd.) (1.5 % owf) and "Disper TL" (anionic surfactant manufactured by Meisei Chemical Co., Ltd.) (1 g/L) with a solution ratio of 1: 30 at 120°C for 60 minutes, washed with water and dried.

Dyeing with dispersion dye: The refined yarn is treated with "Resorcin Blue FBL" (dispersion dye manufactured by Bayer A.G.) (1 % owf) and "Disper TL" (1 g/L) with a solution ratio of 1 : 40 at 120°C for 60 minutes. Then, the product is further treated with hydrosulfite (2 g/L), sodium hydroxide (2 g/L) and "A-myladin" anionic surfactant manufactured by Daiichi Kogyo Seiyaku Co., Ltd.) with a solution ration of 1 : 50 at 80°C for 20 minutes, washed with water and dried.

Dry cleaning: The yarn is treated with Perclene containing "Neuron NP 85" (nonionic surfactant manufactured by Takemoto oils and fats Co., Ltd.) (10 g/l), "AD-800" (anionic surfactant manufactured by Takemoto oils and fats Co., Ltd.) (10 g/L) and water (1 ml/L) at 30°C for 30 minutes and dried in an atmosphere.

Washing with soap: The yarn is washed with a 0.3 percent solution of soap with a solution ratio of 1 : 50 at 60°C for 10 minutes by the aid of a washing machine, washed with water, dehydrated and dried in hot air at 80°C.

EXAMPLE 5

As in Example 4, polyethylene terephthalate is admixed with a fireproof agent and subjected to melt spinning. The results are shown in Table 5.

Table 5

| Test material | III | IV | V | VI | VII |
|---|---|---|---|---|---|
| Fireproof agent | D | D | D | E | F |
| Amount used (parts) | 6 | 12 | 16 | 9 | 10 |
| Spinning temperature (°C) | 280 | 280 | 280 | 280 | 280 |
| Stretching ratio (times) | 4.10 | 4.10 | 4.10 | 4.10 | 4.10 |
| Fineness (d) | 2.07 | 2.09 | 2.08 | 2.02 | 2.10 |
| Strength (g/d) | 4.28 | 4.07 | 3.70 | 4.24 | 4.16 |
| Elongation (%) | 20.6 | 18.6 | 19.0 | 21.2 | 21.0 |
| Strength of knot (g/d) | 3.76 | 3.58 | 3.25 | 3.73 | 3.66 |
| Elongation of knot (%) | 9.2 | 8.0 | 7.5 | 8.5 | 8.8 |
| melting point (°C) | 256 | 248 | 241 | 256 | 255 |
| Non-inflammability (coil method)(number of times) | | | | | |
| Before refining | 6 | 7 | 8 | 6–7 | 6–7 |
| After refining | 6 | 7 | 8 | 6–7 | 6–7 |
| After refining and bleaching | 5 | 6 | 7 | 6–7 | 6–7 |
| After refining, bleaching and treatment with with fluorecent dye | 4 | 5 | 6 | 5 | 5 |
| After refining and dyeing | 5 | 6 | 7 | 6 | 6 |
| After dry cleaning (10 times) | 5–6 | 7 | 8 | 6–7 | 6–7 |
| After washing with soap (10 times) | 5–6 | 7 | 8 | 6–7 | 6–7 |
| Oxygen index (after spinning) (n %) | 26.5 | 31.5 | 33.0 | 28.5 | 29.0 |

EXAMPLE 6

Pulverized polyethylene terephthalate as in Example 2 (90 parts) is admixed with a fireproof agent (10 parts), dried in a glass ampoule at 110° to 120°C under a pressure below 1 mmHg for 16 hours and kneaded at 285°C in nitrogen stream for 30 minutes. The viscosity of the product is shown in Table 6.

TABLE 6

| Fire proof agent | Amount (parts) | Average degree of polymerization | Viscosity of heated product [η] |
|---|---|---|---|
| H | 10 | 31.7 | 0.48 |
| I | 10 | 12.1 | 0.42 |
| J | 10 | 11.6 | 0.42 |
| K | 10 | 10.7 | 0.41 |
| M | 10 | 8., | 0.40 |
| M | 10 | 3.6 | 0.24 |

As shown in the above Table the fireproof agent having a smaller degree of polymerization results in considerable decrease in the viscosity of polyethylene terephthalate incorporated therewith.

EXAMPLE 7

The composition containing a fireproof agent is subjected to melt spinning and stretching as in Example 5. The obtained yarn is knitted by the aid of a knitting machine for socks. The knitting is irradiated by ultraviolet ray with a fadeometer, and the whiteness is determined by the aid of a spectrophotometer. The results are shown in Table 7.

TABLE 7

| Fireproof agent | | Amount (parts) | Whiteness | | |
|---|---|---|---|---|---|
| No. | Structure | | Immediately after (before irradiation with UV ray) | After 40 hours | After 100 hours |
| D | [structure with P=O, phenyl, –SO₂–, phenyl, ]₂₈ | 8 | 68 | 53 | 40 |
| F | [structure with P=O, phenyl with CH₃ groups, –SO₂–, phenyl with CH₃ groups, ]₁₀ | 8 | 70 | 64 | 57 |
| N | [structure with P=O, phenyl, –C(CH₃)₂–, phenyl, ]₁₀ | 8 | 66 | 40 | 20 |

TABLE 7—Continued

| Fireproof agent | | Amount (parts) | Whiteness | | |
|---|---|---|---|---|---|
| No. | Structure | | Immediately after (before irradiation with UV ray) | After 40 hours | After 100 hours |
| X | $\left[\begin{array}{c}\text{O}\\\|\\\text{P O}\\\|\\\text{C}_6\text{H}_5\end{array}-\text{C}_6\text{H}_4-\text{O}\right]_{32}$ | 8 | 70 | 20 | −4 |
| D | $\left[\begin{array}{c}\text{O}\\\|\\\text{P O}\\\|\\\text{C}_6\text{H}_5\end{array}-\text{C}_6\text{H}_4-\text{SO}_2-\text{C}_6\text{H}_4-\text{O}\right]_{28}$ | 15 | 63 | 48 | |
| X | $\left[\begin{array}{c}\text{O}\\\|\\\text{P O}\\\|\\\text{C}_6\text{H}_5\end{array}-\text{C}_6\text{H}_4-\text{O}\right]_{32}$ | 15 | 55 | −5 | |
| Z | $\left[\begin{array}{c}\text{O}\\\|\\\text{P O}\\\|\\\text{C}_6\text{H}_5\end{array}-\text{C}_6\text{H}_3(\text{O}-)\right]_{25}$ | 15 | 58 | 21 | |

As seen in the above Table, the composition containing the fireproof agent according to the present invention is not so much colored by ultraviolet ray as in case if containing any other phosphorus compound as a fireproof agent.

EXAMPLE 8

The yarn obtained in Example 4 is immersed in a dyeing bath containing a cationic dye (2 % owf), acetic acid (1.5 % owf) and "Emal-O" (anionic surfactant manufactured by Kao Soap Co., Ltd.) (1 g/L) with a solution ratio of 1 : 50 at 120°C for 60 minutes. Then, the product is further immersed in a dyeing bath containing hydrosulfite (2 g/L), sodium hydroxide (2 g/L) and "Amyladin" (anionic surfactant manufactured by Daiichi Kogyo Seiyaku Co., Ltd.) (2 g/L) with a solution ratio of 1 : 50 at 80°C for 20 minutes, washed with water and dried. The dyeing results are shown in Table 8.

Table 8

| Cationic dye | Manufacture by | Manufactured I | II |
|---|---|---|---|
| Maxilon brilliant flavine 10GFF | Geigy A.G. | moderate | stained |
| Astrazone orange (CI Basic orange 27) | Bayer A.G. | moderate | stained |
| Aizen katiron brilliant pink BH (CI Red 36) | Hodogaya Kagaku Co., Ltd. | moderate | stained |
| Aizen katiron brilliant red 4GH (CI Basic red 14) | Hodogaya Kagaku Co., Ltd. | moderate | stained |
| Astrazone blue G (CI Basic blue 1) | Bayer A.G. | moderate | stained |
| Maxilon brilliant green 3G | Geigy A.G. | moderate | stained |

From the above Table, it is surprisingly noted that the composition of the invention (e.g. test material I ) possesses an affinity to a cationic dye.

EXAMPLE 9

The non-inflammable polyethylene terephthalate yarn obtained in Example 4 is dyed in a dyeing bath containing "Mikawhite ATconc" (manufacture by Mitsui Chemical Co., Ltd.) (2.0 % owf) and "Disper TL" (anionic surfactant manufactured by Meisei Chemical Co., Ltd.) (1.0 g/L) with a solution ratio of 1:40 at 100°C for 90 minutes. The product (50 mg) is treated with monochlorobenzene (100 ml), and the absorbance of the monochlorobenzene solution at 365 m$\mu$ is measured by the aid of a spectrophotometer. The results are shown in Table 9.

Table 9

| Test material | = log T | I/II |
|---|---|---|
| I | 0.362 | 2.15 |
| II | 0.169 | 1.00 |

As shown in the above table the coloring degree of the test material I is 2.15 times as large as that of the test material II.

EXAMPLE 10

The yarn obtained in Example 4 or 5 is dyed with a dispersion dye, and the reflection rate at 400 to 760 mµ of the chloroform extract of the dyed yarn is measured by the aid of a spectrophotometer. The coloring degree is determened from the reflection rate, and the results are shown in Table 10.

Table 10

| Test material | X | Y | Z | Relection rate at 420 mµ | K/S |
|---|---|---|---|---|---|
| | | (%) | | | |
| I | 0.1041 | 0.0940 | 0.3105 | 29.8 | 0.827 |
| II | 0.1185 | 0.1071 | 0.3567 | 35.4 | 0.589 |
| III | 1.1150 | 0.1045 | 0.3441 | 34.2 | 0.633 |

As understood from the above Table, the composition of the invention is colored more deeply.

EXAMPLE 11

The yarn (2.0 to 2.3 d) obtained in Example 4 and subjected to various treatments is chraged with a load of 1.3 g, and the bending timed of the yarn required for snapping are recorded. The results are shown in Table II wherein the values are the average on 20 pieces of the yarns.

Table 11

| Test material | Treatment | weight of load (g) | number of bending times |
|---|---|---|---|
| I | spinning and stretching | 1.3 | >10,000 |
| II | | | >10,000 |
| I | refining, bleaching and treatment with fluorescent dye | 1.3 | 1,200 |
| II | | | >10,000 |
| I | refining and dyeing | | 1,415 |
| II | | 1.3 | >10,000 |
| Commercially available pilling polyethylene terephthalate yarns | (1) | | 660 |
| | (2) | | 2,700 |
| | (3) | 1.3 | 460 |
| | (4) | | 2,550 |

When the number of bending times is below 3,000, 3000, the yarn is generally thought to have a good pilling-resistant property for the practical use. Thus, the composition of the invention apprently possesses a high pilling-resistant property. Further, it is notable that the pilling-resistant property of the yarn becomes stronger after various treatments than before various treatments.

What is claimed is:

1. A fireproof, thermoplastic polyester composition which comprises a polyester selected from the group consisting of polyethylene terephthalate, fiber-forming copolymerized polyesters containing not less than 80 mol % of ethylene terephthalate unit, poly1,4-cyclohexylidenedimethylene terephthalate, polyethylene sebacate and polyethylene adipate, and a polyaryl phosphonate incorporated therein in an amount of 0.4 to 4.0 weight percent as phosphorus to said polyester, said polyaryl phosphonate having a degree of polymerization not less than 6 and being prepared by reacting a diol component selected from the group consisting of a sulfone compound of the formula:

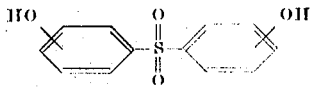

wherein the benzene ring(s) may bear one or more lower alkyl groups and a mixture of said sulfone compound and at least one aromatic diol compound of the formulas:

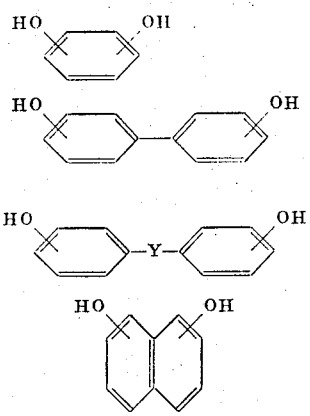

wherein Y is alkylidene or cycloalkylidene having one to six carbon atoms and the benzene ring(s) may bear one or more lower alkyl groups, with a compound of the formula:

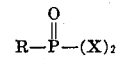

wherein R is aryl and X is chlorine or bromine at 100° to 200°C. under atmospheric pressure and then at 150° to 250°C. under atmospheric pressure or reduced pressure in an inert gas or dry air.

2. The fireproof, thermoplastic polyester composition according to claim 1, wherein said sulfone compound is selected from the group consisting of 4,4'-dihydroxydiphenyl sulfone; 2,4'-dihydroxydiphenyl sulfone; 3,3'-dimenthyl-4,4'-dihydroxydiphenyl sulfone; 2,2'-dimethyl-4,4'-dihydroxy-5,5'-di-t-butyl-diphenyl sulfone; 2,2'-dihydroxy-3,3'-dimethyldiphenyl sulfone; and 3,3',5,5'-tetramethyl-4,4'-dihydroxydiphenyl sulfone.

3. The fireproof, thermoplastic polyester composition according to claim 1, wherein said aromatic diol compound is selected from the group consisting of hydroquinone; resorcinol; 4,4'-dihydroxybiphenyl,4,4'-methylenebisphenol; 4,4'-ethylidenebisphenol; 4,4'-isopropylidenebisphenol; 4,4'-cyclohexylidenebisphenol; 2,2'-methylene-bisphenol, 1,5-dihydroxynaphthalene; and 2, 7-dihydroxynaphthalene 4. The fireproof, thermoplastic polyester composition according to claim 1, wherein the compound having the formula:

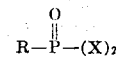

is selected from the group consisting of phenyl-dichlorophosphine oxide, and phenyldibromophosphine oxide.

5. The fireproof, thermoplastic polyester composition of claim 1 wherein R is selected from the group consisting of phenyl, tolyl, xylyl, and naphthyl.

6. The fireproof, thermoplastic polyester composition of claim 1, wherein the diol component and the compound having the formula:

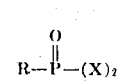

are reacted in approximately equimolar proportions.

7. The fireproof, thermoplastic polyester composition of claim 1, wherein the diol component is said sulfone compound.

8. The fireproof, thermoplastic polyester composition of claim 1, wherein the diol component is the mixture of said sulfone compound and, at least one of said aromatic diols, said mixture containing more than 30 mol percent of said sulfone compound.

9. The fireproof, thermoplastic polyester composition of claim 1, wherein said sulfone compound is 4,4'-dihydroxydiphenyl sulfone and said polyaryl phosphonate is phenyldichlorophosphine oxide.

10. The fireproof, thermoplastic polyester composition of claim 9, wherein the sulfone compound is a mixture of 4,4'-dihydroxydiphenyl sulfone and 2,4'-dihydroxydiphenyl sulfone and the polyaryl phosphonate is phenyldichlorophosphine oxide.

11. The fireproof, thermoplastic polyester composition of claim 9, wherein the sulfone is 3,3'dimethyl-4,4'-dihydroxydiphenyl sulfone and the polyaryl phosphonate is phenyldichlorophosphine oxide.

12. The fireproof, thermoplastic polyester composition of claim 9, wherein the sulfone is 3,3',5,5' tetramethyl-4,4'dihydroxydiphenyl sulfone and the polyaryl phosphonate is phenyldichlorophosphine oxide.

13. A fireproof, thermoplastic polyester composition which comprises a polyester selected from the group consisting of polyethylene terephthalate, fiber-forming copolymerized polyesters containing not less than 80 mol percent of ethylene terephthalate unit, poly-1,4-cyclohexylidenedimethylene terephthalate, polyethylene sebacate and polyethylene adipate and a polyaryl phosphonate incorporated therein in an amount of 0.4 to 4.0 percent as phosphorus to said polyester, said polyaryl phosphonate having a degree of polymerization not less than 6 and prepared by surface polymerization of a compound of the formula:

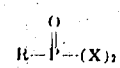

wherein R is aryl and X is chlorine or bromine dissolved in a solvent with a diol component selected from the group consisting of a sulfone compound of the formula:

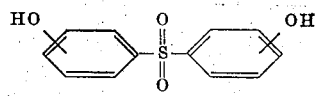

wherein the benzene ring(s) may bear one or more lower alkyl groups and a mixture of said sulfone compound and at least one aromatic diol compound selected from the group consisting of the formulas:

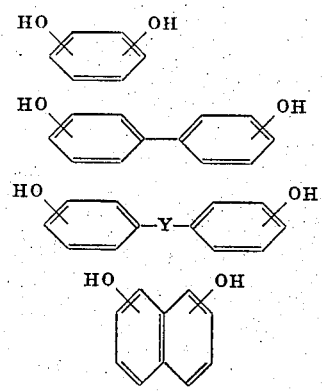

wherein Y is alkylidene or cycloalkylidene having one to six carbon atoms and the benzene ring(s) may bear one or more lower alkyl groups as alkali metal salt(s) dissolved in water while stirring.

* * * * *